United States Patent
Chae

(10) Patent No.: US 8,139,183 B2
(45) Date of Patent: Mar. 20, 2012

(54) ARRAY SUBSTRATE FOR LIQUID CRYSTAL DISPLAY DEVICE AND MANUFACTURING METHOD OF THE SAME

(75) Inventor: Gee-Sung Chae, Incheon (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 12/869,548

(22) Filed: Aug. 26, 2010

(65) Prior Publication Data

US 2011/0273650 A1    Nov. 10, 2011

Related U.S. Application Data

(62) Division of application No. 11/966,835, filed on Dec. 28, 2007, now Pat. No. 7,808,595.

(30) Foreign Application Priority Data

Apr. 2, 2007 (KR) .......... 10-2007-0032220
Apr. 17, 2007 (KR) .......... 10-2007-0037256

(51) Int. Cl.
*G02F 1/1335* (2006.01)
*G02F 1/1343* (2006.01)

(52) U.S. Cl. .......... 349/107; 349/141; 349/139; 349/138

(58) Field of Classification Search .......... 349/139, 349/143, 141, 106, 107, 187, 43, 138, 110
See application file for complete search history.

(56) References Cited

U.S. PATENT DOCUMENTS

| | | | |
|---|---|---|---|
| 6,768,531 B2 * | 7/2004 | Ochiai et al. | 349/141 |
| 6,980,266 B2 | 12/2005 | Choi | |
| 7,463,321 B2 | 12/2008 | Song et al. | |
| 7,561,238 B2 * | 7/2009 | Sakamoto et al. | 349/141 |
| 2004/0263752 A1 | 12/2004 | Kim | |
| 2005/0078256 A1 | 4/2005 | Hong | |

* cited by examiner

*Primary Examiner* — Thoi Duong
(74) *Attorney, Agent, or Firm* — Birch, Stewart, Kolasch & Birch, LLP

(57) ABSTRACT

According to an embodiment, an array substrate for an LCD device includes a substrate; gate lines on the substrate along a first direction; data lines formed along a second direction and crossing the gate lines to define pixel regions; a common line between adjacent gate lines; a thin film transistor at each crossing point of the gate lines and the data lines; red, green and blue color filter patterns sequentially disposed in the pixel regions, respectively; a common electrode over each of the red, green and blue color filter patterns and connected to the common line; and a pixel electrode over the common electrode and connected to the thin film transistor, the pixel electrode overlapping the common electrode.

6 Claims, 11 Drawing Sheets

ARRAY SUBSTRATE FOR LIQUID CRYSTAL DISPLAY DEVICE AND MANUFACTURING METHOD OF THE SAME

The present application is a divisional application of application Ser. No. 11/966,835 filed Dec. 28, 2007 now U.S. Pat. No. 7,808,595 which application claimed the priority benefits of Korean Patent Applications No. 10-2007-0032220 filed in Korea on Apr. 2, 2007 and No. 10-2007-0037256 filed in Korea on Apr. 17, 2007. The entire contents of each of the above-identified applications are hereby incorporated by reference.

BACKGROUND OF THE INVENTION

1. Field of the Invention

The present invention relates to a liquid crystal display (LCD) device, and more particularly, to an array substrate for a liquid crystal display device and a manufacturing method of the same.

2. Discussion of the Related Art

Liquid crystal display (LCD) devices are driven based on optical anisotropy and polarization characteristics of a liquid crystal material. Liquid crystal molecules have a long and thin shape, and the liquid crystal molecules are regularly arranged along in an alignment direction. Light passes through the LCD device along the long and thin shape of the liquid crystal molecules. The alignment of the liquid crystal molecules depends on the intensity or the direction of an electric field applied to the liquid crystal molecules. By controlling the intensity or the direction of the electric field, the alignment of the liquid crystal molecules is controlled to display images.

Generally, an LCD device includes two substrates, which are spaced apart and facing each other, and a liquid crystal layer is interposed between the two substrates. Each of the substrates includes an electrode. The electrodes from respective substrates face one another. An electric field is induced between the electrodes by applying a voltage to each electrode. An alignment direction of liquid crystal molecules changes in accordance with a variation in the intensity or the direction of the electric field.

FIG. 1 is a view of schematically illustrating an LCD device according to the related art. In FIG. 1, the related art LCD device 11 includes transparent lower and upper substrates 10 and 30 spaced apart from and facing each other. The LCD device further includes a liquid crystal layer (not shown) interposed between the lower and upper substrates 10 and 30.

Gate and data lines 12 and 20 are formed on an inner surface of the lower substrate 10 and cross each other to define pixel regions P. Thin film transistors T are formed at crossing points of the gate and data lines 12 and 20. The thin film transistors T are arranged in a matrix type. Each thin film transistor T includes a gate electrode 14, an active layer 16, a source electrode 17 and a drain electrode 18. A pixel electrode 22 is formed at each pixel region P and is connected to a corresponding thin film transistor T. The pixel electrode 22 is formed of a transparent conductive material, which transmits light well, such as indium-tin-oxide.

A black matrix 32 is formed on an inner surface of the upper substrate 30 that faces the lower substrate 10. The black matrix 25 covers a non-display region, such as the gate lines 12, the data lines 20, and the thin film transistors T and has a lattice shape surrounding the pixel regions P. A color filter layer is formed in each opening of the lattice of the black matrix 32. The color filter layer includes red, green and blue color filter patterns 34a, 34b and 34c corresponding to the pixel regions P. A transparent common electrode 36 is formed on the black matrix 32 and the color filter layer 34a, 34b and 34c.

The lower substrate 10 including the gate and data lines 12 and 20, the thin film transistors T and the pixel electrodes 22 may be referred to as an array substrate. The upper substrate 30 including the black matrix 32, the color filter layer 34a, 34b and 34c and the common electrode 36 may be referred to as a color filter substrate.

The array substrate and the color filter substrate are separately manufactured, aligned, and then attached with each other to thereby fabricate a liquid crystal panel. At this time, there is high possibility that light leakage occurs due to alignment margins. To prevent the light leakage, the black matrix 32 may have wider width, and it causes decrease in an aperture area.

Accordingly, to solve the problem, a color filter on array structure (COA) type LCD device has been proposed in which the color filter layer is formed on the array substrate.

FIG. 2 is a cross-sectional view of schematically illustrating an array substrate for a COA-type LCD device according to the related art.

In FIG. 2, a thin film transistor T is formed on a transparent insulating substrate 50, and the thin film transistor T includes a gate electrode 54, an active layer 58, an ohmic contact layer 60, a source electrode 62 and a drain electrode 64. In addition, a gate line 52 and a data line 66 are formed on the substrate 50. The gate electrode 54 is connected to the gate line 52, and the source electrode 60 is connected to the data line 66. Although not shown in the figure, the gate line 52 and the data line 66 cross each other to define a pixel region P. A black matrix BM and a color filter layer are formed on the substrate 50 including the thin film transistor T, the gate line 52 and the data line 66. The black matrix BM corresponds to the thin film transistor T and covers the active layer 58. The color filter layer includes red and green color filters 72a and 72b, which correspond to respective pixel regions P. The color filter layer further includes blue color filter (not shown).

A transparent pixel electrode 76 is formed on the color filter layer. The pixel electrode 76 is connected to the drain electrode 64.

Since the array substrate includes the color filter layer, it is not necessary to design by considering alignment margins. Therefore, the aperture area can be more obtained.

By the way, in an LCD device including the array substrate, an electric field is induced between the pixel electrode 76 and a common electrode (not shown), which is formed on an opposite substrate to the array substrate, and is perpendicular to the substrate 50. The LCD device has very narrow viewing angles. To increase the viewing angles of the LCD device, an in-plane switching (IPS) mode LCD device has been suggested, in which the common electrode and the pixel electrode are formed on the same substrate.

FIG. 3 is a cross-sectional view of illustrating an array substrate for a COA-IPS mode LCD device according to the related art. FIG. 4 is a schematic view of explaining dielectric constants of color filter patterns of FIG. 3.

In FIG. 3 and FIG. 4, a pixel region P is defined on an insulating substrate 80. A thin film transistor T and a color filter layer 96a, 96b and 96c, a pixel electrode 98a and a common electrode 98b are formed in the pixel region P.

The thin film transistor T includes a gate electrode 84, an active layer 88a, an ohmic contact layer 88b, a source electrode 90 and a drain electrode 92. The gate electrode 84 is connected to a gate line 82, and the source electrode 90 is connected to the data line 94. Although not shown in the figure, the gate line 82 and the data line 94 cross each other and are disposed at two sides of the pixel region P.

The color filter layer 96a, 96b and 96c is formed over the substrate 80 including the thin film transistor T, the gate line 82 and the data line 94. The color filter layer includes red, green and blue color filter patterns 96a, 96b and 96c. A black matrix BM is formed between the thin film transistor T and the color filter patterns 96a, 96b and 96c.

The pixel electrode 98a and the common electrode 98b are formed over the color filter patterns 96a, 96b and 96c. The pixel electrode 98a and the common electrode 98b are spaced apart from and alternate with each other. The pixel electrode 98a is connected to the drain electrode 92 and receives signals independently in each pixel region P according to operations of the thin film transistor T. The common electrodes 98b of all the pixel regions P receive a common signal. The common signal may be a direct current (DC) voltage of about 5 V.

Meanwhile, the color filter patterns 96a, 96b and 96c may be a stripe type, in which the color filter patterns 96a, 96b and 96c in vertically or horizontally adjacent pixel regions have the same color. The color filter patterns 96a, 96b and 96c may be formed by a pigment dispersion method, in which a pigment-dispersed photosensitive material is applied and then is patterned through a photolithographic process. Here, pigments are used a colored article for the color filter patterns 96a, 96b and 96c. The pigments have high lightfastness and heat resistance. The pigment dispersion method simplifies a process of forming the color filer patterns 96a, 96b and 96c.

The green color filter pattern 96b is thicker than the red and blue color filter patterns 96a and 96c so that the color purity of the green color filter pattern 96b may be uniformalized with color purities of the red and blue color filter patterns 96a and 96c.

However, even though the COA-IPS mode LCD device has a larger aperture ratio and wide viewing angles, band-shaped speckles may occur due to the color filter patterns.

Referring to FIG. 4, when the pixel electrode 98a and the common electrode 98b are formed over each of the color filter patterns 96a, 96b and 96c, an electric field induced between the pixel electrode 98 and the common electrode 98b is influenced by a dielectric constant of a liquid crystal layer (not shown) in an upper side and by a dielectric constant of the color filter patterns 96a, 96b and 96c in a lower side. Accordingly, a first capacitor $C_{LC}$ is formed by the pixel electrode 98a, the common electrode 98b and the liquid crystal layer at each pixel region, and second capacitors $C_{CR}$, $C_{CG}$ and $C_{CB}$ are formed by the pixel electrode 98a, the common electrode 98b and the color filter patterns 96a, 96b and 96c in respective pixel regions. The first capacitor $C_{LC}$ has the same capacitance every pixel region. The second capacitors $C_{CR}$, $C_{CG}$ and $C_{CB}$ have different capacitances because the dielectric constant $\in 2$ of the green color filter pattern 96b is different from the dielectric constants $\in 1$ and $\in 2$ of the red and blue color filter patterns 96a and 96c. For example, the dielectric constants $\in 1$ and $\in 2$ of the red and blue color filter patterns 96a and 96c may be 4±1, and the dielectric constant $\in 2$ of the green color filter pattern 96b may be 5±1.

Therefore, carriers induced in the color filter patterns 96a, 96b and 96c are not smoothly refreshed. This cause afterimages or band-shaped speckles according to the color filter patterns 96a, 96b and 96c, thereby lowering image qualities.

SUMMARY OF THE INVENTION

Accordingly, the present invention is directed to an array substrate for an LCD device and a manufacturing method of the same that substantially obviate one or more of the problems due to limitations and disadvantages of the related art.

An advantage of the present invention is to provide an array substrate for an LCD device and a manufacturing method of the same that have uniform image qualities.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, according to an embodiment an array substrate for an LCD device includes a substrate, gate lines on the substrate along a first direction, data lines formed along a second direction and crossing the gate lines to define first, second and third pixel regions, thin film transistors at crossing points of the gate lines and the data lines, red, green and blue color filter patterns sequentially disposed in the first, second and third pixel regions, respectively, first, second and third common lines corresponding to the first, second and third pixel regions and receiving first, second and third common voltages, respectively, wherein the second common voltage is different from the first and third common voltages, a pixel electrode over each of the red, green and blue color filter patterns and connected to one of the thin film transistors, and a common electrode over each of the red, green and blue color filter patterns and connected to one of the first, second and third common lines, the common electrode spaced apart from the pixel electrode.

In another aspect, a manufacturing method of an array substrate for an LCD device includes forming gate lines on a substrate along a first direction, forming data lines formed along a second direction and crossing the gate lines to define first, second and third pixel regions, forming thin film transistors at crossing points of the gate lines and the data lines, forming first, second and third common lines corresponding to the first, second and third pixel regions and receiving first, second and third common voltages, respectively, wherein the second common voltage is different from the first and third common voltages, forming red, green and blue color filter patterns sequentially disposed in the first, second and third pixel regions, respectively, forming a pixel electrode over each of the red, green and blue color filter patterns and connected to one of the thin film transistors, and forming a common electrode over each of the red, green and blue color filter patterns and connected to one of the first, second and third common lines, the common electrode spaced apart from the pixel electrode.

In another aspect, an array substrate for an LCD device includes a substrate, gate lines on the substrate along a first direction, data lines formed along a second direction and crossing the gate lines to define pixel regions, a common line between adjacent gate lines, a thin film transistor at each crossing point of the gate lines and the data lines, red, green and blue color filter patterns sequentially disposed in the pixel regions, respectively, a common electrode over each of the red, green and blue color filter patterns and connected to the common line, and a pixel electrode over the common electrode and connected to the thin film transistor, the pixel electrode overlapping the common electrode.

In another aspect, a manufacturing method of an array substrate for an LCD device includes forming gate lines on a substrate along a first direction, forming data lines along a second direction and crossing the gate lines to define pixel regions, forming a common line between adjacent gate lines, forming a thin film transistor at each crossing point of the gate lines and the data lines, forming red, green and blue color filter patterns over thin film transistor, the red, green and blue color filter patterns sequentially disposed in the pixel regions, respectively, forming a common electrode over each of the red, green and blue color filter patterns and connected to the common line, and forming a pixel electrode over the common electrode and connected to the thin film transistor, the pixel electrode overlapping the common electrode.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to embodiments of the present invention, examples of which are illustrated in the accompanying drawings.

Figure 1:
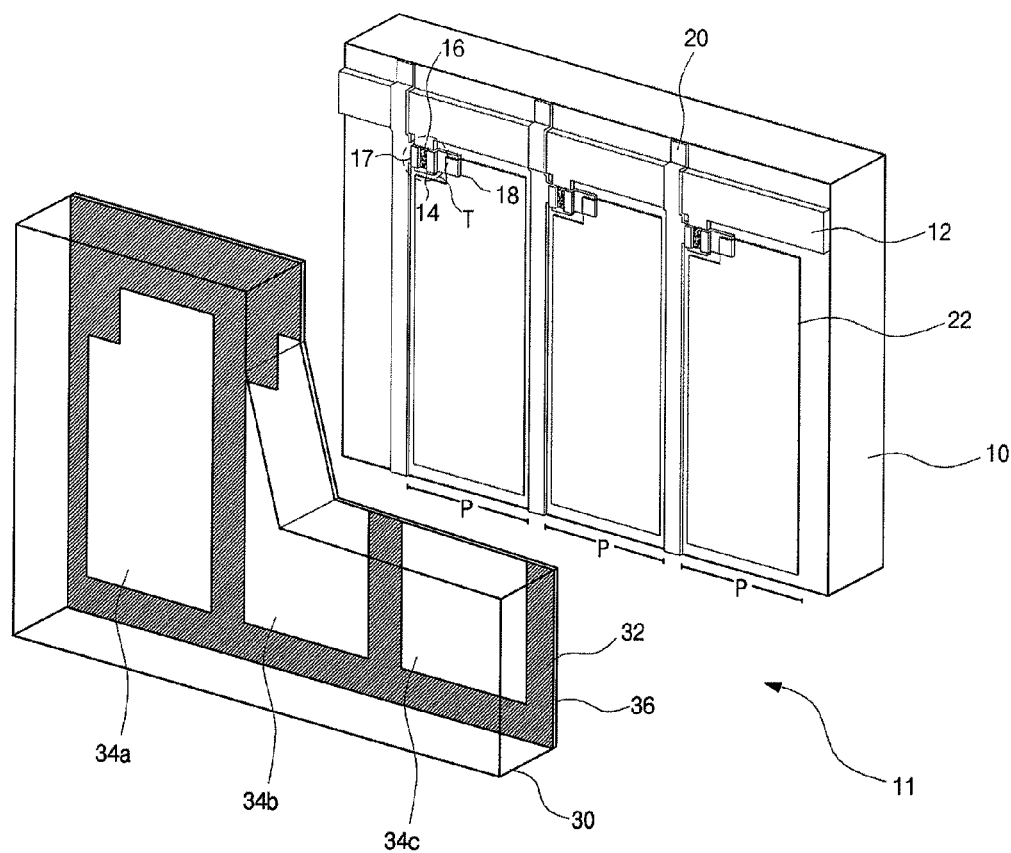
FIG. 1 is a view of schematically illustrating an LCD device according to the related art.
Figure 2:
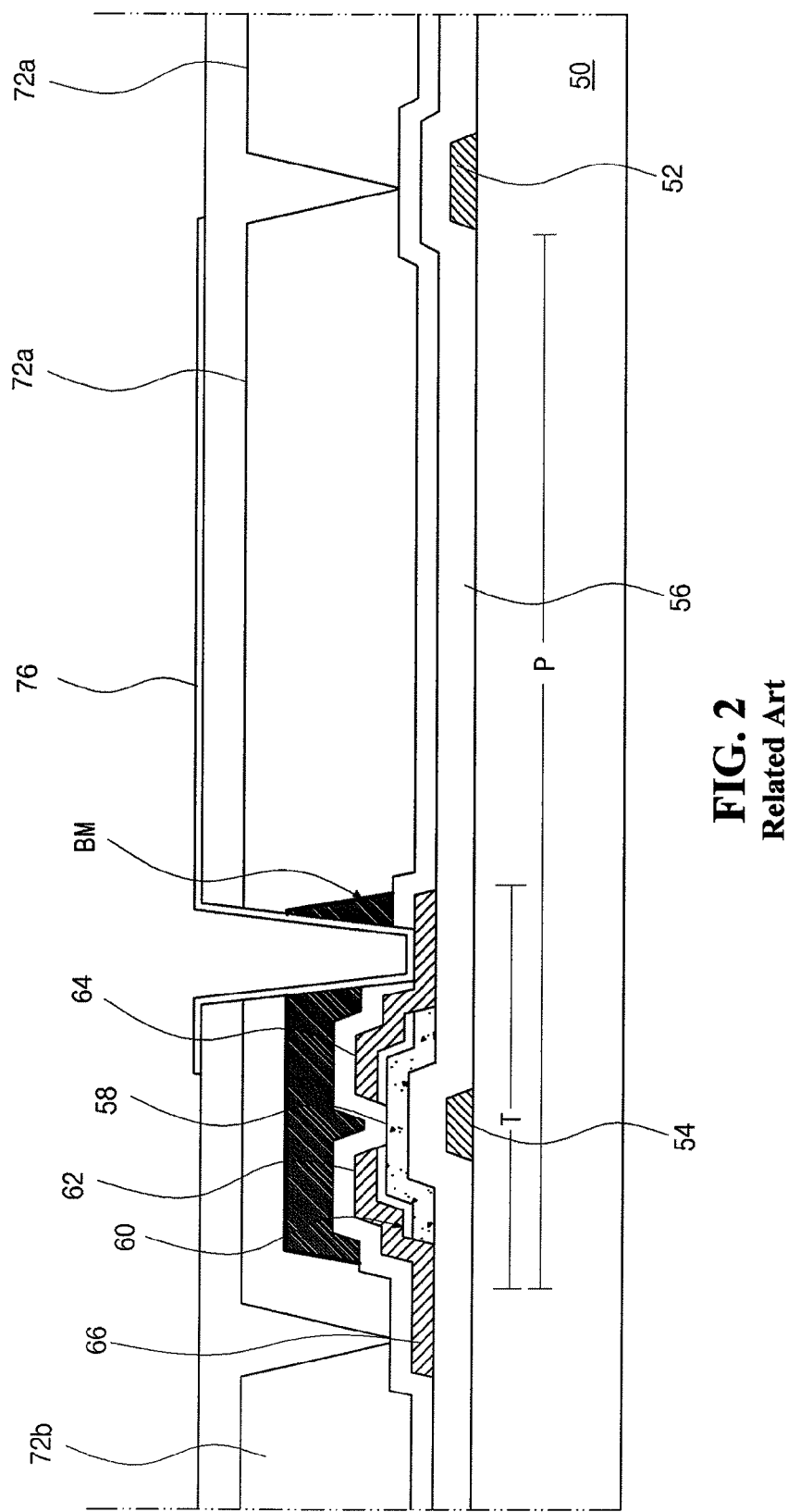
FIG. 2 is a cross-sectional view of schematically illustrating an array substrate for a COA-type LCD device according to the related art.
Figure 3:
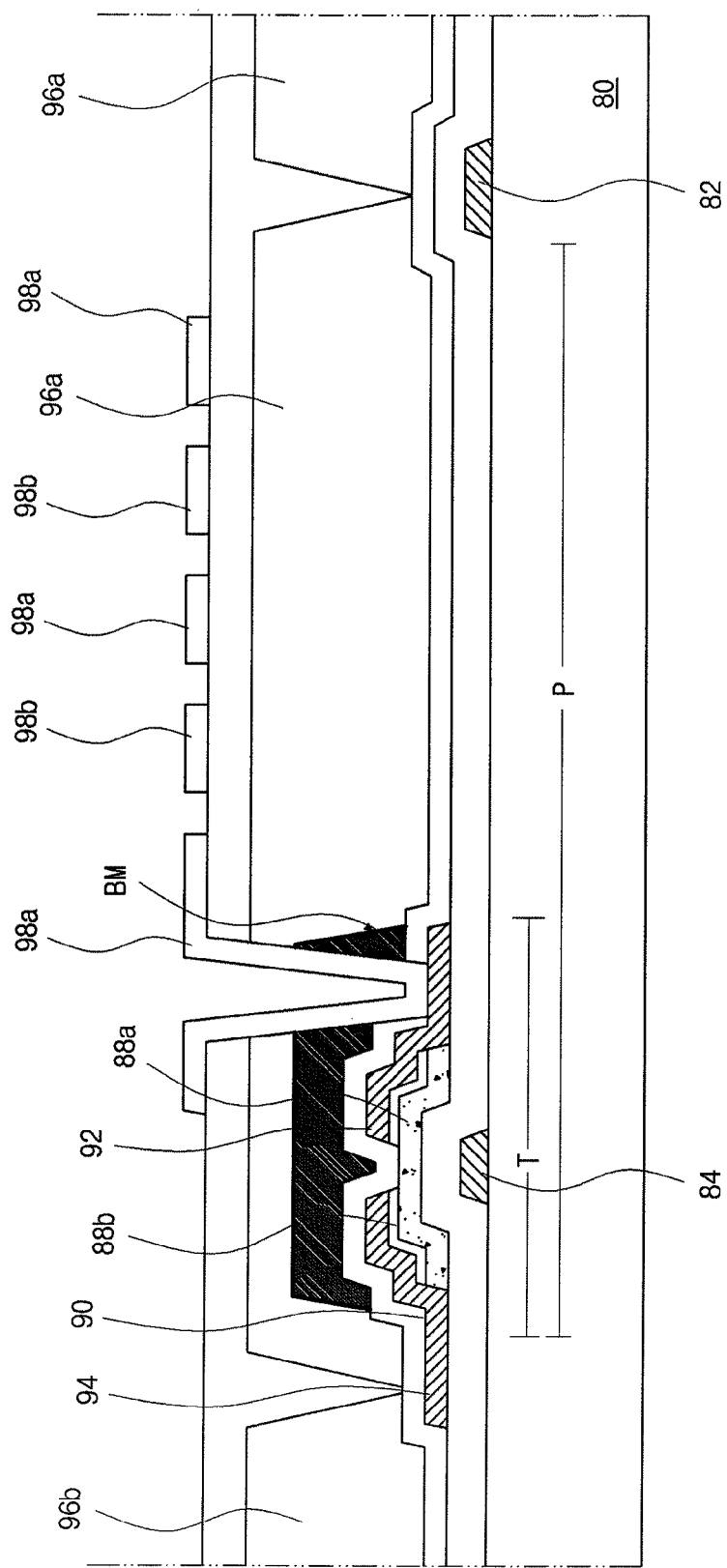
FIG. 3 is a cross-sectional view of illustrating an array substrate for a COA-IPS mode LCD device according to the related art.
Figure 4:
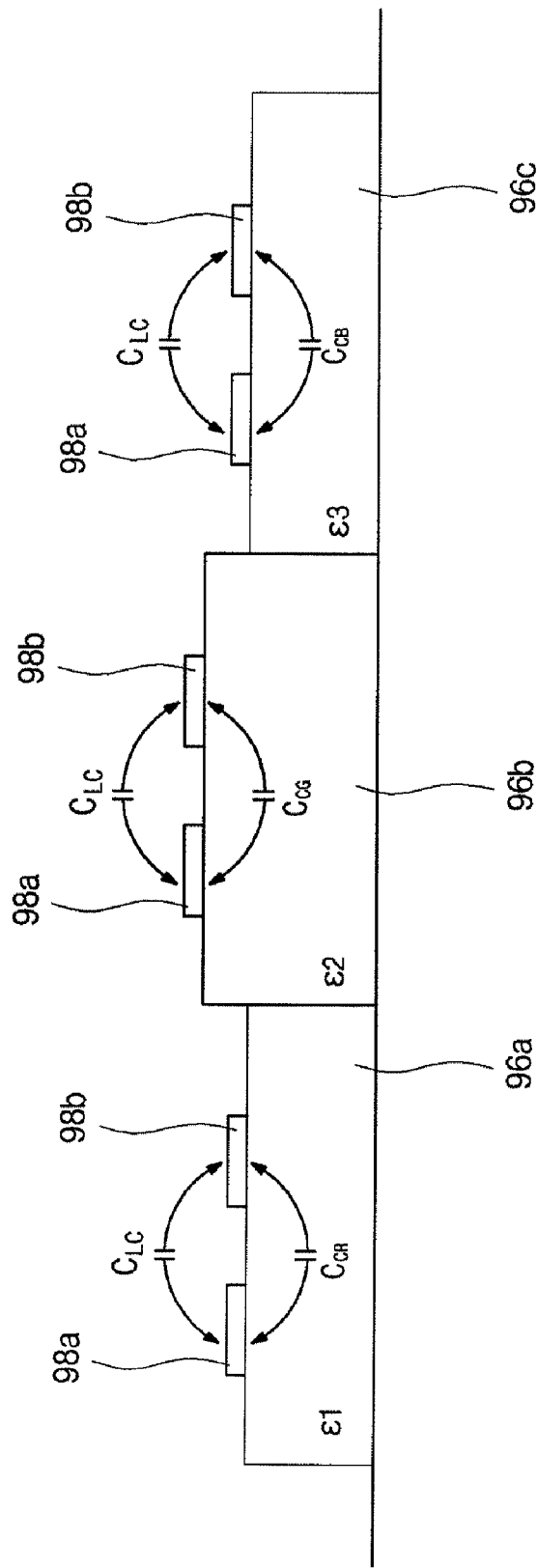
FIG. 4 is a schematic view of explaining dielectric constants of color filter patterns of FIG. 3.
Figure 5:
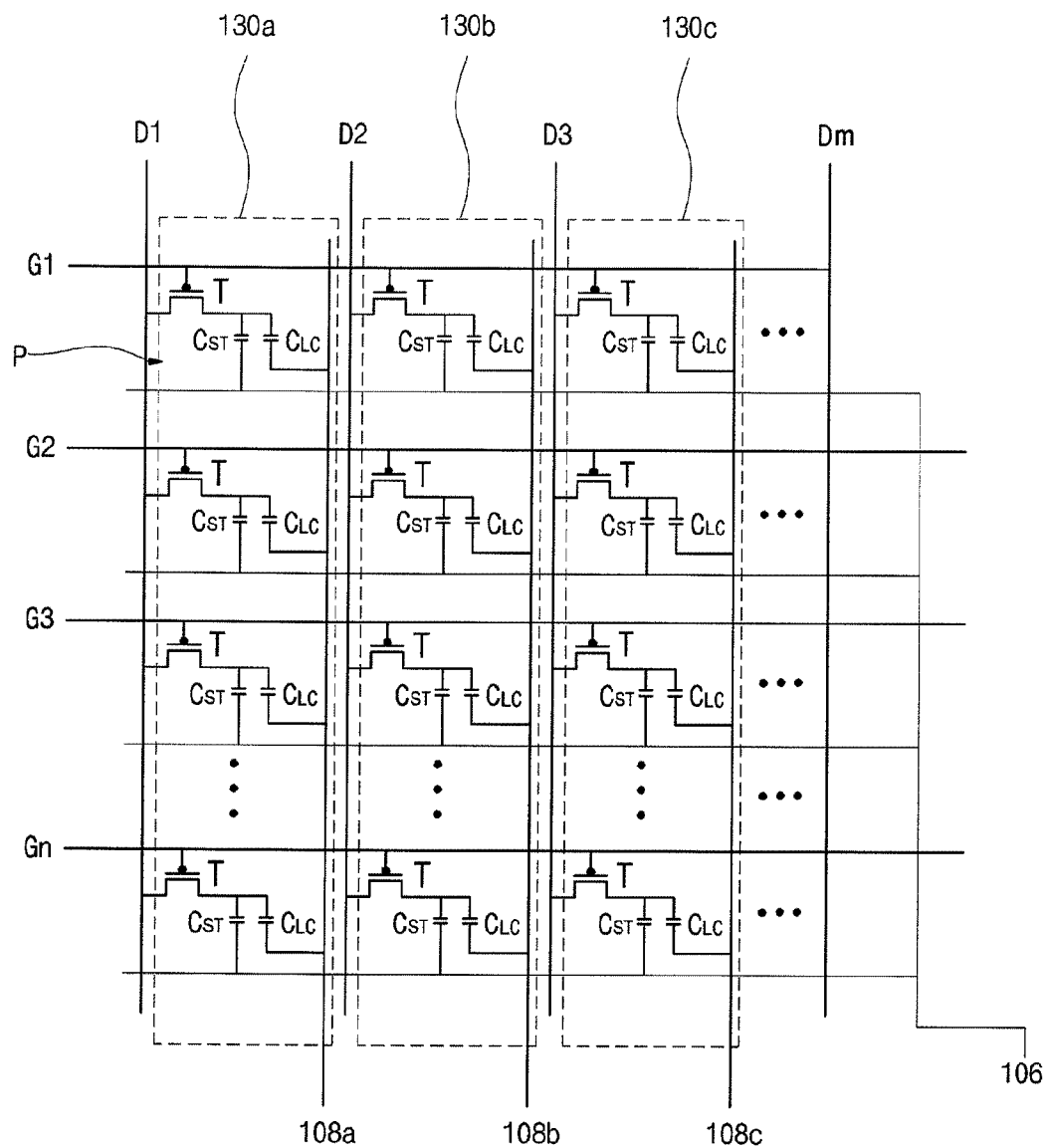
FIG. 5 is an equivalent circuit of an LCD device according to a first embodiment of the present invention.

FIG. 5 is an equivalent circuit of an LCD device according to a first embodiment of the present invention.

In FIG. 5, gate lines G1, G2, G3 to Gn (n is a natural number) are formed along a first direction and spaced apart from each other. Data lines D1, D2, D3 to Dm (m is a natural number) are formed along a second direction and cross the gate lines G1, G2, G3 to Gn to define pixel regions P.

A thin film transistor T, a liquid crystal capacitor $C_{LC}$ and a storage capacitor $C_{ST}$ are formed at each pixel region P. The thin film transistor T is connected to a corresponding gate line G1, G2, G3 or Gn and a corresponding data line D1, D2, D3 to Dm. The storage capacitor $C_{ST}$ is connected to the liquid crystal capacitor $C_{LC}$ substantially in parallel.

A color filter layer 130a, 130b and 130c is formed in each pixel region P such that one color corresponds to one pixel region P. Here, the color filter layer 130a, 130b and 130c is a stripe type in which color filter patterns along the second direction are the same color and are connected to each other. The color filter layer includes red, green and blue color filter patterns 130a, 130b and 130c.

The liquid crystal capacitor $C_{LC}$ is connected to the thin film transistor T and a corresponding common line 108a, 108b or 108c. The storage capacitor $C_{ST}$ is connected to the thin film transistor T and a storage line 106. The liquid crystal capacitor $C_{LC}$ receives a data voltage and a common voltage from the corresponding data line D1, D2, D3 or Dm and the corresponding common line 108a, 108b or 108c, respectively. The storage capacitor $C_{ST}$ receives the data voltage and a storage voltage from the corresponding data line D1, D2, D3 or Dm and the storage line 106, respectively.

The common voltage is a direct current (DC) voltage. The data voltage is an alternating current (AC) voltage. The data voltage alternates between a positive polarity and a negative polarity with respect to the common voltage.

Storage capacitances of the storage capacitors $C_{ST}$ are the same all over the area of the LCD device. The same storage voltage is applied to all pixel regions P through the storage line 106.

On the other hand, first, second and third common lines 108a, 108b and 108c are connected to respective liquid crystal capacitors $C_{LC}$ at the pixel regions P, which correspond to the red, green and blue color filter patterns 130a, 130b and 130c, respectively. Different common voltages are applied to the liquid crystal capacitors $C_{LC}$ through the first, second and third common lines 108a, 108b and 108c, respectively, to compensate differences in pixel voltages due to different dielectric constants of the color filter patterns 130a, 130b and 130c.

That is, if the pixel voltages are alternately driven on basis of the same common voltage when there is difference between the pixel voltages, positive and negative polarities of the pixel voltages are not uniform. Accordingly, there may be difference between the pixel voltages of adjacent pixel regions, and the band-shaped speckles may occur.

However, the problem can be solved by applying the different common voltages to the liquid crystal capacitors $C_{LC}$.

Figure 6:
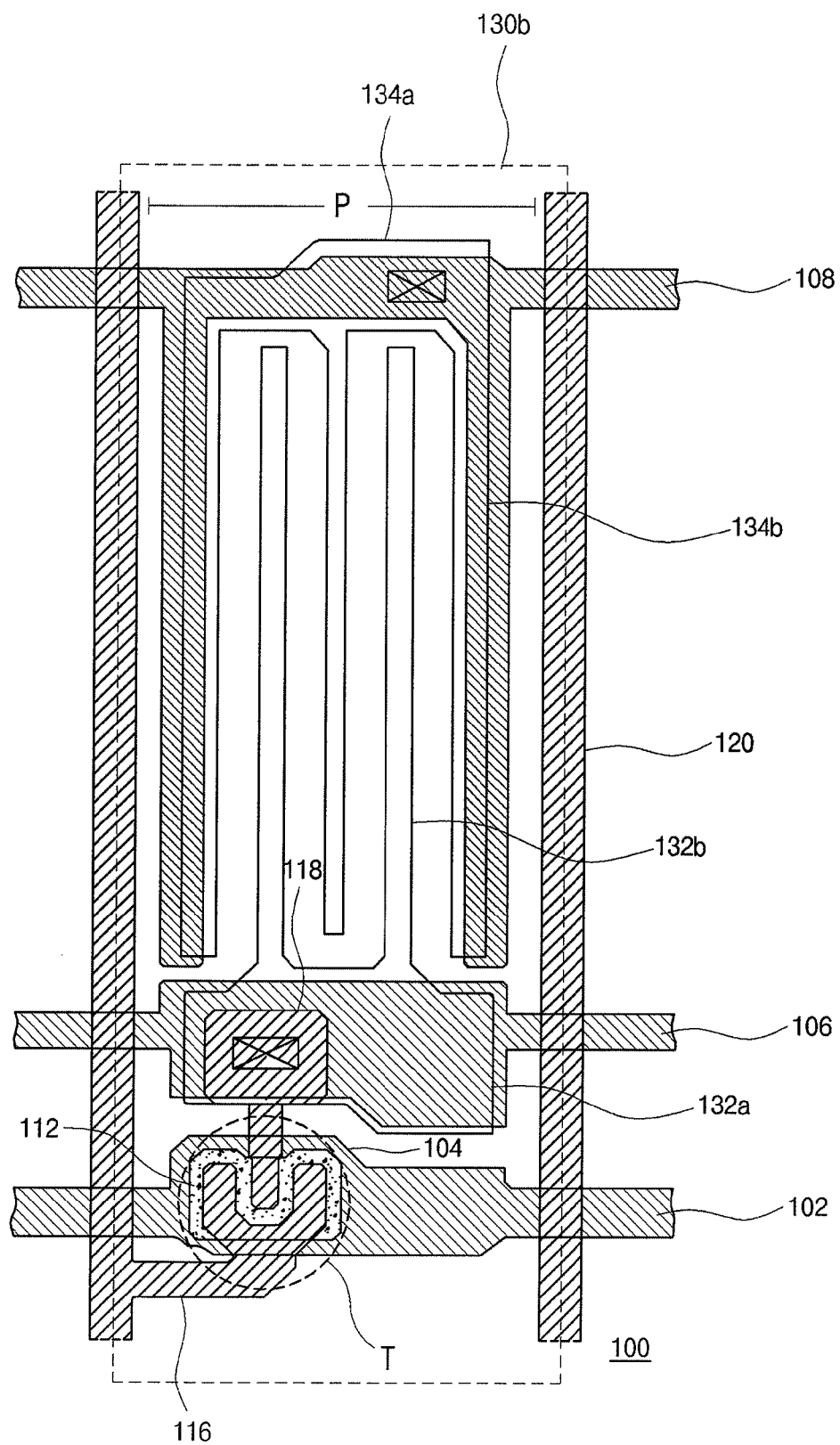
FIG. 6 is a plan view of illustrating an array substrate for an LCD device according to the first embodiment of the present invention.

FIG. 6 is a plan view of illustrating an array substrate for an LCD device according to the first embodiment of the present invention.

In FIG. 6, a gate line 102 is formed on a substrate 100 along a first direction. A data line 120 is formed along a second direction. The gate line 102 and the data line 120 cross each other to define a pixel region P. A thin film transistor T is formed at a crossing point of the gate line 102 and the data line 120. The thin film transistor T includes a gate electrode 104, an active layer 112, a source electrode 116 and a drain electrode 118. The gate electrode 104 is connected to the gate line 102, and the source electrode 116 is connected to the data line 120.

A storage line 106 and a common line 108 are formed along the first direction and are spaced apart from each other. The storage line 106 may be adjacent to the gate line 102.

A color filter pattern 130a, for example, a red color filter pattern, is formed in the pixel region P. Although not shown in the figure, a green color filter pattern and a blue color filter pattern are respectively formed in next two pixel regions along the first direction. The green color filter pattern may be thicker than the red and blue color filter patterns.

Although not shown in the figure, a black matrix may be further formed between the thin film transistor T and the color filter pattern 130a.

A pixel electrode 132a and 132b and a common electrode 134a and 134b are formed in the pixel region P and are spaced apart from each other. Although not shown in the figure, the pixel electrode 132a and 132b and the common electrode 134a and 134b are disposed over the color filter pattern 130a.

The pixel electrode includes a first horizontal portion 132a and first vertical portions 132b. The first horizontal portion 132a is connected to the drain electrode 118. The first horizontal portion 132a overlaps the storage line 106 to form a storage capacitor. The first vertical portions 132b extend from the first horizontal portion 132a along the second direction. The common electrode includes a second horizontal portion 134a and second vertical portions 134b. The second horizontal portion 134a is connected to the common line 108. The second vertical portions 134b extend from the second horizontal portion 134a and alternate with the first vertical portions 132b.

As stated above, the common electrode 134a and 134b receives a different common voltage from those in pixel regions adjacent to the pixel region P along the first direction.

Accordingly, the difference in the pixel voltages due to different dielectric constants of the color filter patterns can be compensated, and images uniform qualities can be displayed.

Figure 7:
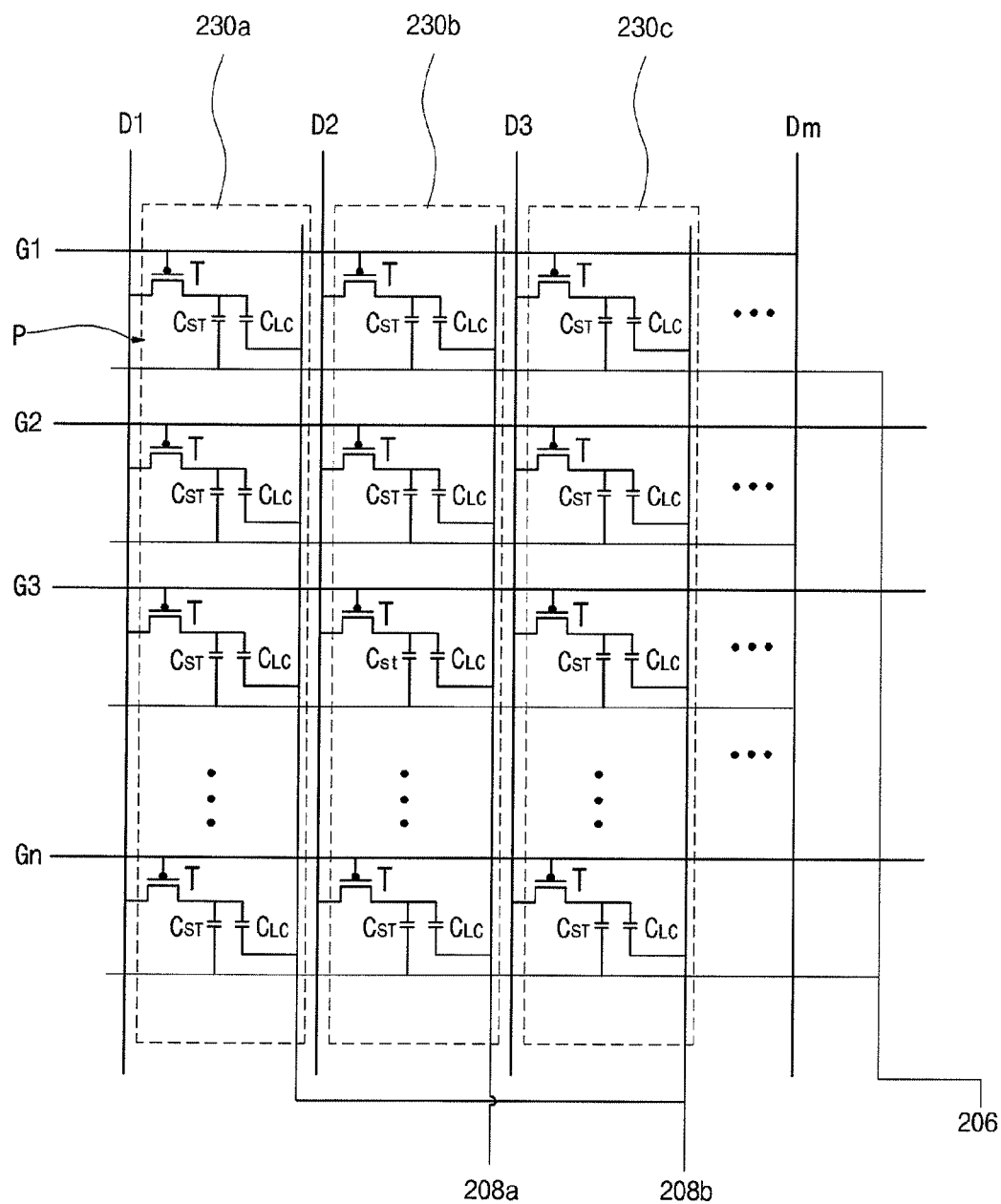
FIG. 7 is an equivalent circuit of an LCD device according to a second embodiment of the present invention.

FIG. 7 is an equivalent circuit of an LCD device according to a second embodiment of the present invention.

In FIG. 7, gate lines G1, G2, G3 to Gn (n is a natural number) are formed along a first direction and spaced apart from each other. Data lines D1, D2, D3 to Dm (m is a natural number) are formed along a second direction and cross the gate lines G1, G2, G3 to Gn to define pixel regions P.

A thin film transistor T, a liquid crystal capacitor $C_{LC}$ and a storage capacitor $C_{ST}$ are formed at each pixel region P. The thin film transistor T is connected to a corresponding gate line G1, G2, G3 or Gn and a corresponding data line D1, D2, D3 or Dm. The storage capacitor $C_{ST}$ is connected to the liquid crystal capacitor $C_{LC}$ substantially in parallel.

A color filter layer 230a, 230b and 230c is formed in each pixel region P such that one color corresponds to one pixel region P. Here, the color filter layer 230a, 230b and 230c is a stripe type in which color filter patterns along the second direction are the same color and are connected to each other. The color filter layer includes red, green and blue color filter patterns 230a, 230b and 230c.

The liquid crystal capacitor $C_{LC}$ is connected to the thin film transistor T and a corresponding common line 208a or 208b. The storage capacitor $C_{ST}$ is connected to the thin film transistor T and a storage line 206.

Storage capacitances of the storage capacitors $C_{ST}$ are the same all over the area of the LCD device. The same storage voltage is applied to all pixel regions P through the storage line 206. The storage line 206 may be united in all pixel regions P.

On the other hand, a first common line 208a is connected to the liquid crystal capacitors $C_{LC}$ at the pixel regions P, which correspond to the red and blue color filter patterns 230a and 230c, and a second common line 208b is connected to the liquid crystal capacitors $C_{LC}$ at the pixel regions P, which correspond to the green color filter pattern 230b. The first common line 208a is connected to a first common voltage source (not shown), and the second common line 208b is connected to a second common voltage source (not shown).

The same voltage is applied to the liquid crystal capacitors $C_{LC}$ corresponding to the red and blue color filter patterns 230a and 230c because the red and blue color filter patterns 230a and 230c have similar dielectric constants. The voltage applied to the liquid crystal capacitors $C_{LC}$ corresponding to the red and blue color filter patterns 230a and 230c is different from a voltage applied to the liquid crystal capacitors $C_{LC}$ corresponding to the green color filter pattern 230b.

An array substrate for the LCD device according to the second embodiment may have the same structure as that of the first embodiment illustrated in FIG. 6.

Figure 8:
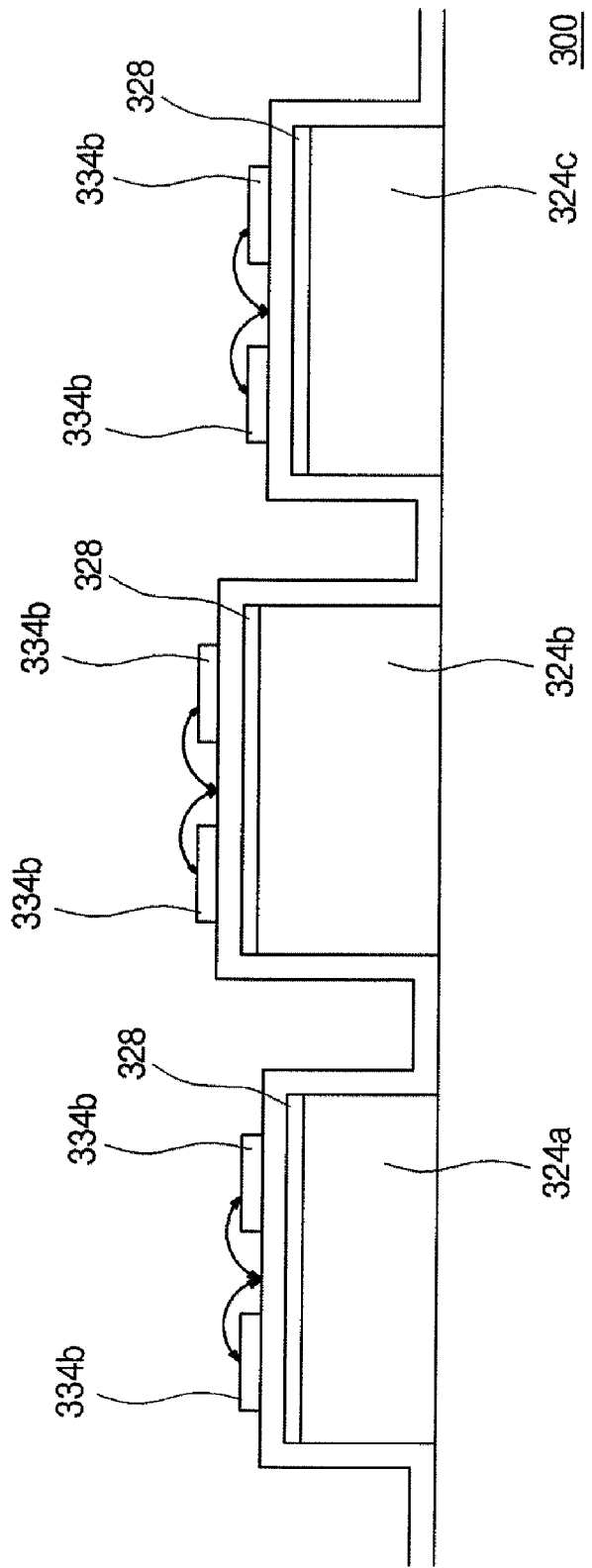
FIG. 8 is a schematic view of illustrating an array substrate for an LCD device according to a third embodiment of the present invention.

FIG. 8 is a schematic view of illustrating an array substrate for an LCD device according to a third embodiment of the present invention. The LCD device is a COA type, in which a color filter layer is formed on the array substrate.

In FIG. 8, red, green and blue color filter patterns 324a, 324b and 324c are formed over a substrate 300. A common electrode 328 is formed on each of the red, green and blue color filter patterns 324a, 324b and 324c. A pixel electrode 334b is formed over the common electrode 328. The pixel electrode 334b overlaps the common electrode 328.

When voltages are applied to the common electrode 328 and the pixel electrode 334b, an electric field is induced between the common electrode 328 and the pixel electrode 334b. At this time, even though charges are induced in the color filter patterns 324a, 324b and 324c, the charges may be screened by the common electrode 328 and may not affect pixels corresponding to respective colors. Accordingly, the pixels can be uniformly driven without effects due to different dielectric constants of the color filter patterns 324a, 324b and 324c, and images having uniform qualities can be displayed.

Figure 9:
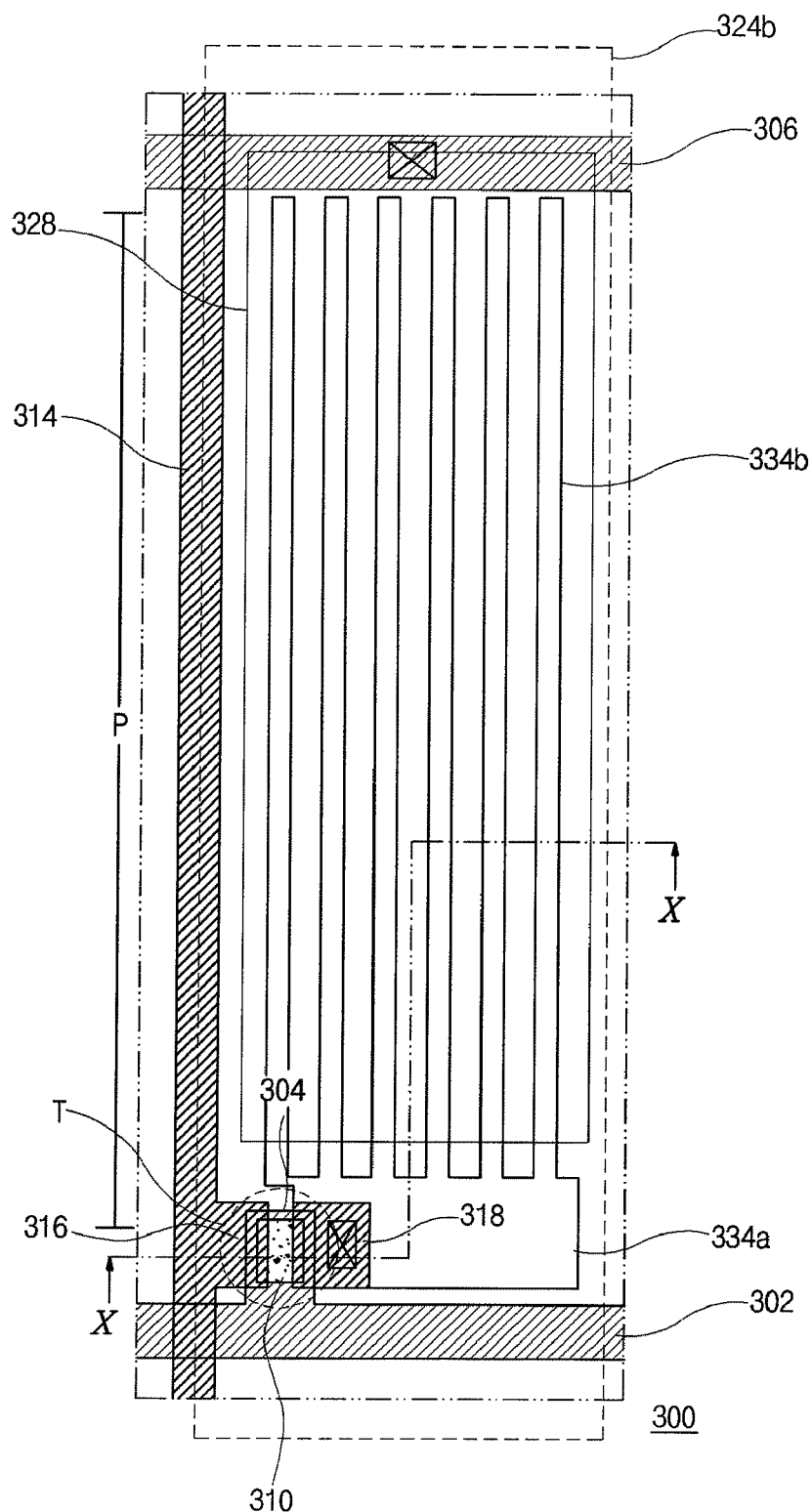
FIG. 9 is a plan view of illustrating an array substrate for an LCD device according to the third embodiment of the present invention.

FIG. 9 is a plan view of illustrating an array substrate for an LCD device according to the third embodiment of the present invention.

In FIG. 9, a gate line 302 is formed on a substrate 300 along a first direction. A data line 314 is formed along a second direction. The gate line 302 and the data line 314 cross each other to define a pixel region P. A thin film transistor T is formed at a crossing point of the gate line 302 and the data line 314. The thin film transistor T includes a gate electrode 304, an active layer 310, a source electrode 316 and a drain electrode 318. The gate electrode 304 is connected to the gate line 302, and the source electrode 316 is connected to the data line 314.

A common line 306 is formed along the first direction and is spaced apart from the gate line 302.

A color filter pattern 324b, for example, a green color filter pattern, is formed in the pixel region P. Although not shown in the figure, a red color filter pattern and a blue color filter pattern are respectively formed in pixel regions adjacent to the pixel region P along the first direction. The same color filter pattern is formed in adjacent pixel regions P along the second direction.

Although not shown in the figure, a black matrix may be formed between the thin film transistor T and the color filter pattern 324b to prevent light incident to the active layer 310.

A pixel electrode 334a and 334b and a common electrode 328 are formed in the pixel region P. Although not shown in the figure, the pixel electrode 132a and 132b and the common electrode 134a and 134b are disposed over the color filter pattern 130a. The common electrode 328 has a flat shape and substantially corresponds to a size of the pixel region P. The pixel electrode includes a horizontal portion 334a and vertical portions 334b. The horizontal portion 334a is connected to the drain electrode 318. The vertical portions 334b extend from the horizontal portion 334a along the second direction. An insulating layer (not shown) is disposed between the common electrode 328 and the pixel electrode 334a and 334b. The vertical portions 334b overlap common electrode 328.

In the array substrate, widths of the vertical portions 334b are narrow such that an electric field between the common electrode 328 and the vertical portions 334b affects even a center of each vertical portion 334b. Accordingly, light leakage such as band-shaped disclination over the electrodes of the LCD device can be minimized.

Figure 10A:
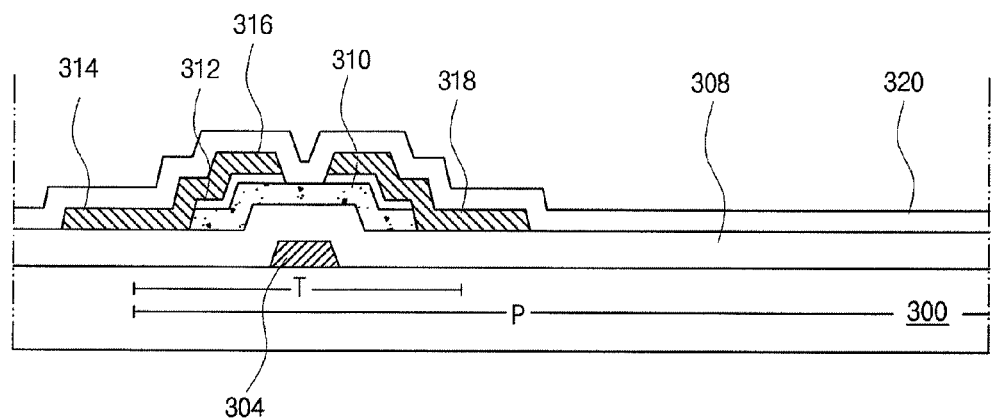
FIGS. 10A to 10C are cross-sectional views of illustrating an array substrate for an LCD device in manufacturing processes according to the third embodiment.
Figure 10B:
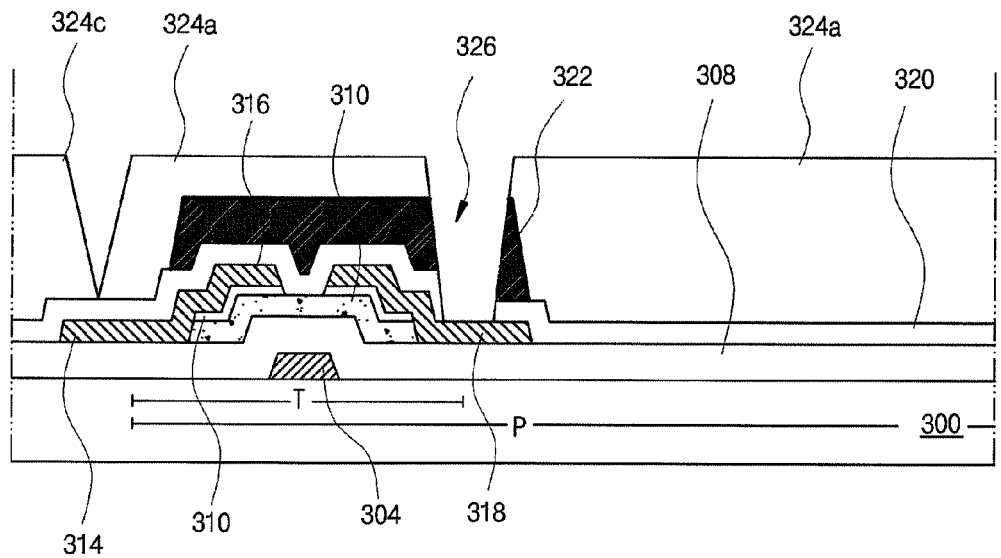
Figure 10C:
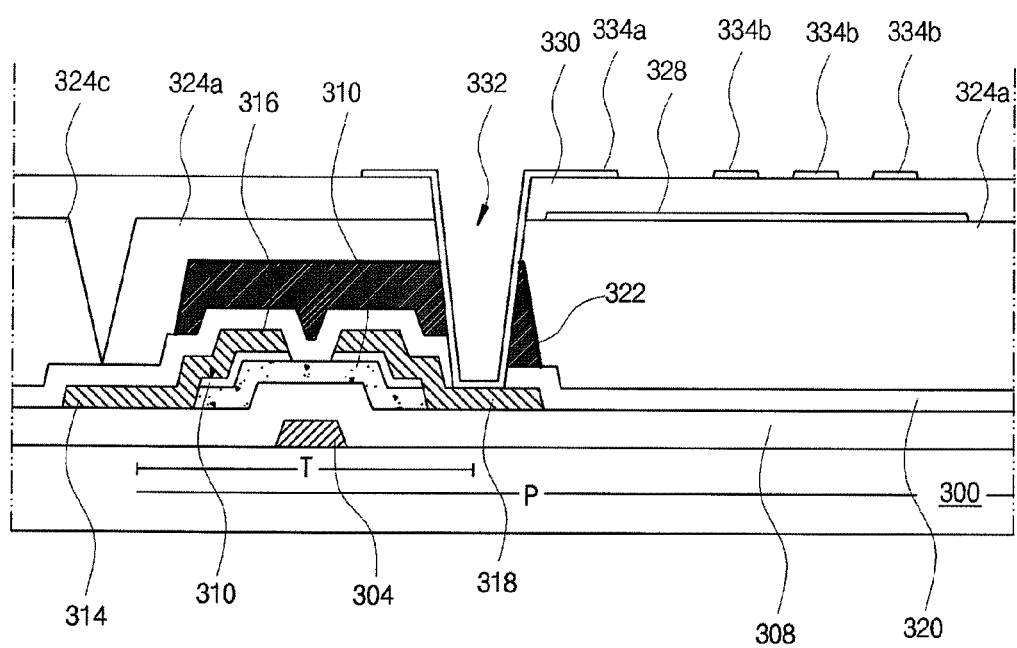

FIGS. 10A to 10C are cross-sectional views of illustrating an array substrate for an LCD device in manufacturing processes according to the third embodiment. FIGS. 10A to 10C correspond to the line X-X of FIG. 9.

In FIG. 10A, a gate line 302 of FIG. 9 and a gate electrode 304 are formed on a substrate 300 by deposing a conductive material and then patterning the conductive material. The metallic material may be selected from a metallic group including chromium (Cr), molybdenum (Mo), tungsten (W), aluminum (Al), copper (Cu) and titanium (Ti). A common line 306 of FIG. 9 is simultaneously formed parallel to the gate line 302 of FIG. 9.

A gate insulating layer 308 is formed on a substantially entire surface of the substrate 300 including the gate line 302 of FIG. 9, the gate electrode 304 and the common line 306 of FIG. 9 by depositing an insulating material. The insulating material may be selected from an inorganic insulating material group including silicon nitride (SiNx) and silicon oxide ($SiO_2$).

Next, an active layer 310 and an ohmic contact layer 312 are formed on the gate insulating layer 308 corresponding to the gate electrode 304 by depositing intrinsic amorphous silicon and impurity-doped amorphous silicon and then pattering the intrinsic amorphous silicon and the impurity-doped amorphous silicon.

A data line 314, a source electrode 316 and a drain electrode 318 are formed on the substrate 300 including the active layer 310 and the ohmic contact layer 312 by depositing a conductive material and then patterning the conductive material. The conductive material may be selected from the above-mentioned metallic group. Although not shown in the figure, the data line 314 crosses the gate line 304 to define a pixel region P. The source electrode 316 extends from the data line 314. The source and drain electrodes 316 and 318 are spaced from each other over the gate electrode 304 and the active layer 310. After forming the source and drain electrodes 316 and 318, a part of the ohmic contact layer 312 between the source and drain electrodes 316 and 318 is removed to thereby expose the active layer 310.

The gate electrode 304, the active layer 310, the ohmic contact layer 312, the source electrode 316 and the drain electrode 318 constitute a thin film transistor T.

A first passivation layer 320 is formed on a substantially entire surface of the substrate 300 including the data line 314, the source electrode 316 and the drain electrode 318 by depositing one selected from the above-mentioned inorganic insulating material group. The first passivation layer 320 protects the exposed surface of the active layer 310. The first passivation layer 320 has relatively good adhesion with the active layer 310, and defects can be minimized in an interface between the passivation layer 320 and the active layer 310.

In FIG. 10B, a black matrix 322 is formed over the thin film transistor T by applying a black resin to a substantially entire surface of the substrate 300 including the first passivation layer 320 and then pattering the black resin. The black matrix 322 may be omitted if there is a black matrix corresponding to the thin film transistor T on an opposite substrate to the substrate 300.

Next, a color filter pattern 324a, for example, a red color filter pattern, is formed in the pixel region P on the substrate 300 including the black matrix 322 by applying a red color resin to the substrate 300 and then patterning the red color resin. Then, a blue color filter pattern 324c and a green color filter pattern (not shown), for example, are formed in next pixel regions by the same method as the color filter pattern 324a.

Here, although not shown in the figure, the green color filter pattern may be thicker than the red and blue color filter patterns to uniformalize the color purities of the red, green and blue color filter patterns.

Next, the color filter pattern 324a, the black matrix 322 and the first passivation layer 320 are selectively removed to form a first drain contact hole 326 exposing the drain electrode 318.

In FIG. 10C, a common electrode 328 is formed on the color filter pattern 324a by depositing a transparent conductive material and then pattering the transparent conductive material. The common electrode 328 has a plate-shape in the pixel region P. The transparent conductive material may be selected from a transparent conductive material group including indium tin oxide and indium zinc oxide.

Next, a second passivation layer 330 is formed on a substantially entire surface of the substrate 300 including the common electrode 328 by depositing one selected from the above-mentioned inorganic insulating material group.

The second passivation layer 330 is selectively removed in a portion corresponding to the first drain contact hole of FIG. 10B to thereby form a second drain contact hole 332 exposing the drain electrode 318.

A pixel electrode 334a and 334b is formed on the second passivation layer 330 by depositing a transparent conductive material and then patterning the transparent conductive material. The transparent conductive material may be selected from the above-mentioned transparent conductive material group.

The pixel electrode includes a horizontal portion 334a and vertical portions 334b. The horizontal portion 334a contacts the exposed drain electrode 318. Although not shown in the figure, the vertical portions 334b extend from the horizontal portion 334a.

In the present invention, even though the red, green and blue color filter patterns have different dielectric constants, there is no effect due to the dielectric constants. Therefore, images having uniform qualities can be displayed.

It will be apparent to those skilled in the art that various modifications and variations can be made in the color filter substrate for an LCD device and manufacturing method thereof of the present invention without departing from the spirit or scope of the invention. Thus, it is intended that the present invention cover the modifications and variations of this invention provided they come within the scope of the appended claims and their equivalents.

What is claimed is:

1. An array substrate for an LCD device, comprising:
a substrate;
gate lines on the substrate along a first direction;
data lines formed along a second direction and crossing the gate lines to define pixel regions;
a common line between adjacent gate lines;
a thin film transistor at each crossing point of the gate lines and the data lines;
red, green and blue color filter patterns sequentially disposed in the pixel regions, respectively;
a common electrode over each of the red, green and blue color filter patterns and connected to the common line; and
a pixel electrode over the common electrode and connected to the thin film transistor, the pixel electrode overlapping the common electrode wherein the green color filter pattern is thicker than the red and blue color filter patterns.

2. The array substrate according to claim 1, further comprising a black matrix between the thin film transistor and one of the red, green and blue color filter patterns in each pixel region.

3. The array substrate according to claim 1, wherein the pixel electrode includes a horizontal portion and vertical portions, the horizontal portion connected to the thin film transistor, the vertical portions extending from the horizontal portion and overlapping the common electrode.

4. A manufacturing method of an array substrate for an LCD device, comprising:

forming gate lines on a substrate along a first direction;

forming data lines along a second direction and crossing the gate lines to define pixel regions;

forming a common line between adjacent gate lines;

forming a thin film transistor at each crossing point of the gate lines and the data lines;

forming red, green and blue color filter patterns over thin film transistor, the red, green and blue color filter patterns sequentially disposed in the pixel regions, respectively;

forming a common electrode over each of the red, green and blue color filter patterns and connected to the common line; and forming a pixel electrode over the common electrode and connected to the thin film transistor, the pixel electrode overlapping the common electrode, wherein the green color filter pattern is thicker than the red and blue color filter patterns.

5. The method according to claim 4, further comprising forming a black matrix in each pixel region between forming the thin film transistor and forming the red, green and blue color filter patterns.

6. The method according to claim 4, further comprising forming a first passivation layer between forming the thin film transistor and forming the red, green and blue color filter patterns and forming a second passivation layer between forming the common electrode and forming the pixel electrode.

\* \* \* \* \*